US010948897B2

(12) United States Patent
Perret et al.

(10) Patent No.: US 10,948,897 B2
(45) Date of Patent: Mar. 16, 2021

(54) RECOATING UNIT, RECOATING METHOD, DEVICE AND METHOD FOR ADDITIVE MANUFACTURING OF A THREE-DIMENSIONAL OBJECT

(71) Applicant: EOS GmbH Electro Optical Systems, Krailling (DE)

(72) Inventors: Hans Perret, Munich (DE); Stefanie Markl, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 151 days.

(21) Appl. No.: 15/630,586

(22) Filed: Jun. 22, 2017

(65) Prior Publication Data
US 2018/0004192 A1    Jan. 4, 2018

(30) Foreign Application Priority Data
Jun. 30, 2016 (DE) ................. 10 2016 211 949.4

(51) Int. Cl.
*B33Y 10/00* (2015.01)
*B33Y 30/00* (2015.01)
(Continued)

(52) U.S. Cl.
CPC ........ *G05B 19/4099* (2013.01); *B22F 3/1055* (2013.01); *B29C 41/30* (2013.01);
(Continued)

(58) Field of Classification Search
CPC ... G05B 19/4099; B33Y 10/00; B29C 64/153; B29C 41/30; B29C 64/386
See application file for complete search history.

(56) References Cited

U.S. PATENT DOCUMENTS

2001/0050448 A1 * 12/2001 Kubo ............. B33Y 30/00
                                                    264/308
2008/0156263 A1   7/2008 Montero-Escuder et al.
(Continued)

FOREIGN PATENT DOCUMENTS

DE     102014222129         5/2016
WO     WO-2006033621 A1 *   3/2006  .............. B27N 5/00
(Continued)

OTHER PUBLICATIONS

European Search Report for Application No. 17178266.7 dated Jan. 17, 2018 (9 pages).

*Primary Examiner* — Kelly M Gambetta
(74) *Attorney, Agent, or Firm* — Seyfarth Shaw LLP

(57) ABSTRACT

A recoating unit (40) serves for equipping or retrofitting a device (1) for additive manufacturing of a three-dimensional object (2) by selectively solidifying a building material (15), preferably a powder, layer by layer. The device (1) comprises a recoater (16) movable across a build area (8) for applying a layer (31*b*, 32*b*) of the building material (15) within the build area (8) and a solidification device (20) for selectively solidifying the applied layer (31*b*, 32*b*) at positions corresponding to a cross-section of the object (2) to be manufactured. The device (1) is formed and/or controlled to repeat the steps of applying and selectively solidifying until the object (2) is completed. The recoating unit (40) comprises at least two recoating rollers (41, 42) spaced apart from each other in a first direction (B1) and extending into a second direction transversely, preferably perpendicularly, to the first direction. At least one of the recoating rollers (41, 42), preferably both of the recoating rollers (41, 42) are formed adjustable in a third direction perpendicular to the first direction and the second direction in the recoating unit (40).

19 Claims, 2 Drawing Sheets

(51) Int. Cl.
  *B29C 64/153* (2017.01)
  *B29C 64/241* (2017.01)
  *B29C 64/218* (2017.01)
  *B29C 64/135* (2017.01)
  *B33Y 40/00* (2020.01)
  *B29C 41/30* (2006.01)
  *B29C 64/386* (2017.01)
  *B33Y 80/00* (2015.01)
  *G05B 19/4099* (2006.01)
  *B22F 3/105* (2006.01)

(52) U.S. Cl.
  CPC .......... *B29C 64/135* (2017.08); *B29C 64/153* (2017.08); *B29C 64/218* (2017.08); *B29C 64/241* (2017.08); *B33Y 10/00* (2014.12); *B33Y 30/00* (2014.12); *B33Y 40/00* (2014.12); *B22F 2003/1056* (2013.01); *B29C 64/386* (2017.08); *B33Y 80/00* (2014.12); *Y02P 10/25* (2015.11)

(56) References Cited

U.S. PATENT DOCUMENTS

| | | | |
|---|---|---|---|
| 2012/0164322 A1* | 6/2012 | Teulet | B22F 3/1055 118/103 |
| 2014/0363585 A1 | 12/2014 | Pialot et al. | |
| 2015/0139849 A1* | 5/2015 | Pialot, Jr. | B23K 26/342 419/55 |
| 2015/0202826 A1* | 7/2015 | Paternoster | B29C 64/386 428/474.7 |
| 2017/0326792 A1 | 11/2017 | Paternoster et al. | |
| 2017/0341365 A1 | 11/2017 | DeLajudie et al. | |

FOREIGN PATENT DOCUMENTS

| | | | | |
|---|---|---|---|---|
| WO | 2013/092757 A1 | 6/2013 | | |
| WO | WO-2014012764 A1 * | 1/2014 | ......... | B29C 64/386 |
| WO | 2015082677 | 6/2015 | | |

* cited by examiner

RECOATING UNIT, RECOATING METHOD, DEVICE AND METHOD FOR ADDITIVE MANUFACTURING OF A THREE-DIMENSIONAL OBJECT

TECHNICAL FIELD OF THE INVENTION

The present invention relates to a method and a device for additive manufacturing of a three-dimensional object by applying a building material, preferably a powder, layer by layer and selectively solidifying it, especially to a recoating unit contained in the device and used for the method or to a recoater provided therewith as well as to a recoating method.

BACKGROUND OF THE INVENTION

Devices and methods of this kind are used for example for Rapid Prototyping, Rapid Tooling or Additive Manufacturing. An example of such a method is known by the name "selective laser sintering or laser melting". Therein, repeatedly a thin layer of pulverulent building material is applied, and the building material in each layer is selectively solidified by selectively irradiating positions corresponding to a cross-section of the object to be manufactured with a laser beam.

WO 2013/092757 A1 describes a device and a method for additive manufacturing of a three-dimensional object from powder. In one embodiment, the powder is applied to the build area by a powder supply that includes a dosing roller and moves across the build area. The applied powder is drawn out to a regular layer by a height-adjustable distributing roller moving behind the powder supply and compacted by a compacting roller following behind which is arranged nearer to the build area than the distributing roller, whereby the layer thickness is reduced. The recoating direction is predetermined by the succession of the rollers.

SUMMARY OF THE INVENTION

The object of the present invention is to provide an alternative or improved recoating unit or manufacturing device or an alternative or improved recoating or manufacturing method for a three-dimensional object by application and selective solidification of the building material layer by layer, wherein especially the recoating direction may preferably be changed.

The object is obtained by a recoating unit according to claim 1, a recoater according to claim 5, a manufacturing device according to claim 7, a recoating method according to claim 10, and a manufacturing method according to claim 15. Further developments of the invention are indicated in the dependent claims, respectively. Therein, the methods may also be further developed by the features that are indicated below or in the dependent claims of the devices or vice versa, or the features of the devices or the methods might also be used for further developing each other.

The recoating unit according to the invention serves for equipping or retrofitting a device for additive manufacturing of a three-dimensional object by selectively solidifying a building material, preferably a powder, layer by layer, wherein the device comprises a recoater movable across a build area for applying a layer of the building material within the build area and a solidification device for selectively solidifying the applied layer at positions corresponding to a cross-section of the object to be manufactured and is formed and/or controlled to repeat the steps of applying and selectively solidifying until the object is completed. The recoating unit comprises at least two recoating rollers spaced apart from each other in a first direction and extending into a second direction transversely, preferably perpendicularly, to the first direction, wherein at least one of the recoating rollers, preferably both of the recoating rollers are arranged to be adjustable in a third direction perpendicular to the first direction and the second direction in the recoating unit. Such a recoating unit makes it possible, for example, to effect applying and compacting a material layer serving for building the object separately from each other by an individual roller, respectively, wherein the recoating unit nevertheless may be used in recoating directions opposite to each other.

Preferably the at least one recoating roller and/or both of the recoating rollers are arranged to be adjustable in the third direction in a way that in a first position, a first one of the at least two recoating rollers projects further into the third direction than a second one of the at least two recoating rollers, and in a second position, the second recoating roller projects further into the third direction than the first recoating roller. This makes it possible, for example, to ensure also for recoating processes in recoating directions opposite to each other that the roller respectively arranged behind may always be arranged closer to the build area than the roller respectively arranged ahead.

Preferably, both of the recoating rollers have the same diameter. This makes it possible, for example, to perform a recoating of the same kind in both the recoating directions.

Preferably, both of the recoating rollers are arranged drivable independently of each other in the recoating unit. This makes it possible, for example, to adjust rotational direction and speed independently of each other. Alternatively, both of the recoating rollers may be drivable depending on each other (i.e. coupled). This makes it possible, for example, to simplify the mechanical structure of the recoating unit.

Preferably, both of the recoating rollers are arranged coupled to each other in their movement in or against the third direction in the recoating unit. This makes it possible, for example, to exchange the height positions of both the recoating rollers using a single drive.

The recoater according to the invention serves for equipping or retrofitting a device for additive manufacturing of a three-dimensional object by selectively solidifying a building material, preferably a powder, layer by layer, wherein the device is adapted to receive the recoater in a way so that it is movable across a build area for applying a layer of the building material within the build area, comprises a solidification device for selectively solidifying the applied layer at positions corresponding to a cross-section of the object to be manufactured, and is formed and/or controlled to repeat the steps of applying and selectively solidifying until the object is completed. The recoater comprises a recoating unit according to the invention. Such a recoater makes it possible, for example, to effect applying and compacting a material layer serving for building the object separately from each other by an individual roller, respectively, wherein the recoater nevertheless may be used in recoating direction's opposite to each other.

Preferably, the recoating unit comprises an ex-changeable recoating module. This makes it possible, for example, to easily adapt the recoater to different recoating requirements depending on the type of the material used and/or the desired layer thickness.

The manufacturing device according to the invention serves for additive manufacturing of a three-dimensional object by selectively solidifying a building material, preferably a powder, layer by layer. The device comprises a recoater movable across a build area for applying a layer of the building material within the build area and a solidification device for selectively solidifying the applied layer at positions corresponding to a cross-section of the object to be manufactured. The device is formed and/or controlled to repeat the steps of applying and selectively solidifying until the object is completed. The recoater is formed as a recoater according to the invention. Such a manufacturing device makes it possible, for example, to effect applying and compacting a material layer serving for building the object separately from each other by an individual roller, respectively, wherein the recoater nevertheless may be used in recoating directions opposite to each other.

Preferably, the device further comprises a device for supplying building material in front of the roller arranged ahead in the respective movement direction. This makes it possible, for example, to supply the building material serving for building the object onto the build area independently from the recoating unit.

Preferably, the recoating unit is arranged within the device in a way that the first direction is the movement direction of the recoater across the build area and the third direction essentially is the vertical direction. This makes it possible, for example, to draw out the building material serving for building the object in a direction traverse to the recoating unit and to change the vertical height adjustment of the recoating rollers.

The recoating method according to the invention is to be carried out in a device for additive manufacturing of a three-dimensional object by selectively solidifying a building material, preferably a powder, layer by layer, wherein the device comprises a recoater movable across a build area for applying a layer of the building material within the build area and a solidification device for selectively solidifying the applied layer at positions corresponding to a cross-section of the object to be manufactured and is formed and/or controlled to repeat the steps of applying and selectively solidifying until the object is completed. A recoating unit is used which comprises at least two recoating rollers spaced apart from each other in a first direction and extending into a second direction transversely, preferably perpendicularly, to the first direction, wherein at least one of the recoating rollers, preferably both of the recoating rollers are adjusted in the recoating unit in a third direction perpendicular to the first direction and the second direction. Such a recoating method makes it possible, for example, to effect applying and compacting a material layer serving for building the object separately from each other by an individual roller, respectively, wherein the recoater nevertheless may be used in recoating directions opposite to each other.

Preferably, depending on a movement of the recoating unit in the first direction or in its opposite direction, the recoating roller arranged behind in the respective movement direction is arranged closer the to the working area than the recoating roller arranged ahead. This makes it possible, for example, that the recoating roller respectively arranged ahead draws out the building material to a regular layer, while the recoating roller respectively arranged behind reduces the layer thickness of the drawn-out layer and/or further smoothens and/or compacts the building material.

Preferably, the height adjustments of the recoating rollers are exchanged at a reversal of the direction of the recoater. This makes it possible, for example, to adapt the recoating unit to the new movement direction at the reversal of the direction.

Preferably, the rotational direction of each of the recoating rollers is selected in a way that each recoating roller, when it is the recoating roller arranged ahead in the respective movement direction, rotates in a contra-rotating way with regard to the respective movement direction. This makes it possible, for example, to draw out the building material to a layer with as low shear as possible.

Preferably, the rotational direction of each of the recoating rollers is selected in a way that each recoating roller, when it is the recoating roller arranged behind in the respective movement direction, stands still or rotates in a co-rotating way with regard to the respective movement direction. This makes it possible, for example, to achieve an effective compaction of the drawn-out layer.

The manufacturing method according to the invention serves for additive manufacturing of a three-dimensional object by selectively solidifying a building material, preferably a powder, layer by layer. The method comprises the steps of applying a layer of the building material within a build area by means of a recoater moving across the build area, selectively solidifying the applied layer at positions corresponding to a cross-section of the object to be manufactured, by means of a solidification device and repeating the steps of applying and selectively solidifying until the object is completed. Applying is carried out by means of a recoating method according to the invention. This makes it possible, for example, to take benefit of the advantages of the recoating method according to the invention for producing a three-dimensional object.

Further features and advantages of the invention will arise from the description of embodiments by reference to the appended drawings.

DETAILED DESCRIPTION OF THE EMBODIMENTS

Figure 1:
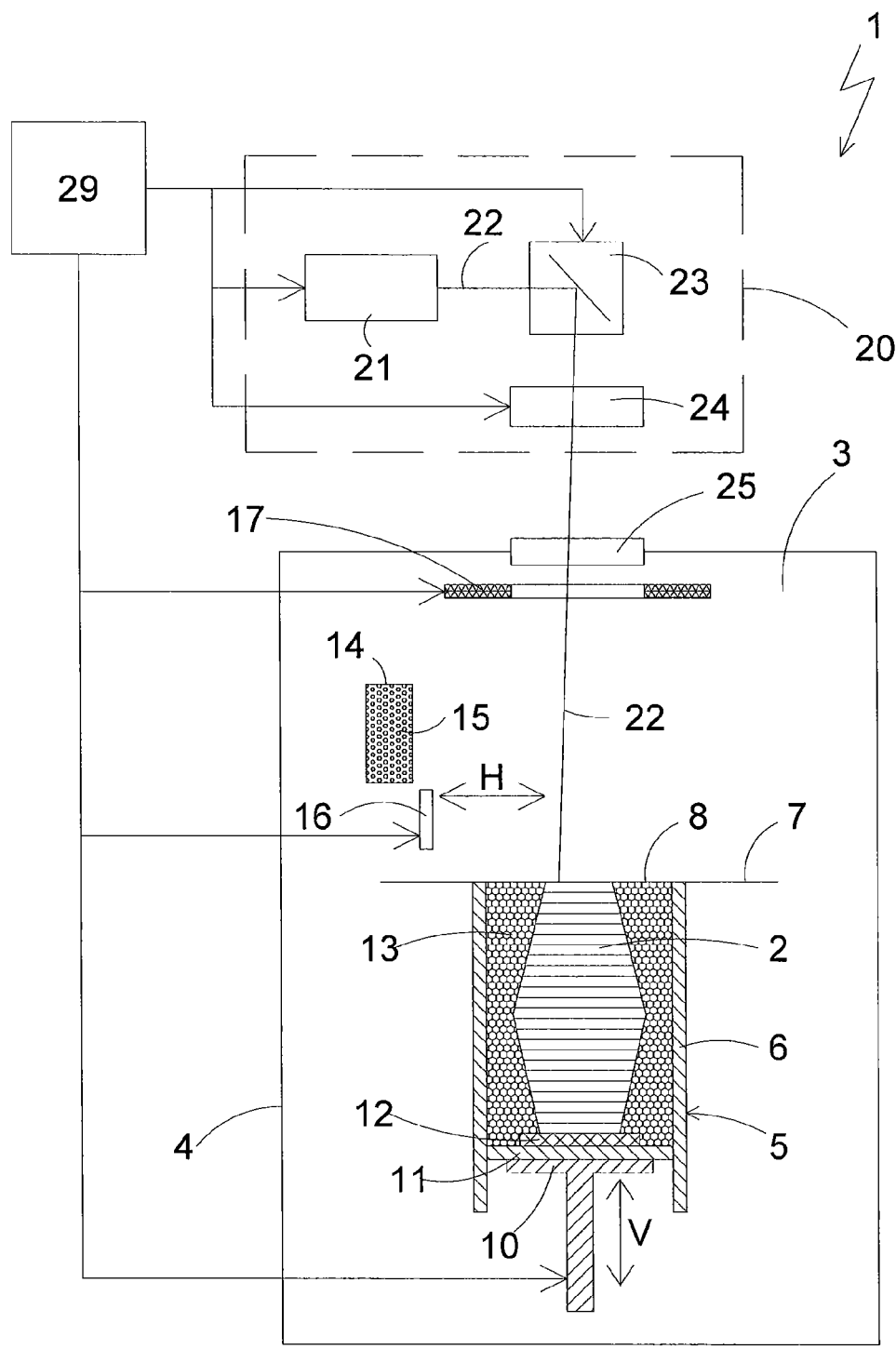
FIG. 1 is a schematic view partially illustrated in cross-section of a device for additive manufacturing of a three-dimensional object layer by layer according to an embodiment of the present invention.

In the following, an embodiment of the present invention is described with reference to FIG. 1. The device illustrated in FIG. 1 is a laser sintering or laser melting device 1. In order to produce an object 2, it includes a process chamber 3 having a chamber wall 4.

In the process chamber 3, a container 5 is arranged which is open at the top and has a container wall 6. By the opening at the top of the container 5, a working plane 7 is defined wherein the area of the working plane 7 which is positioned within the opening and can be used for building the object is designated as a build area 8.

In the container 5, a carrier 10 is arranged which is movable in a vertical direction V and at which a base plate 11 is mounted, closing the container 5 at the bottom and thereby forming its ground. The base plate 11 may be a plate which is formed separately from the carrier 10 and which is mounted at the carrier 7, or it may be formed integrally with the carrier 10. Depending on the powder used and the process performed, a building platform 12 on which the object 2 is built may be mounted as a building base to the base plate 11. The object 2 may, however, also be built on the base plate 11 itself, which then serves as a building base. In FIG. 1 the object 2 to be built in the container 5 on the building platform 12 is illustrated below the working plane 7 in an intermediate state including multiple solidified layers, surrounded by building material 13 that has remained unsolidified.

The laser sintering device 1 further contains a storage container 14 for a pulverulent building material 15 which is solidifyable by means of electromagnetic radiation, and a recoater 16 movable in a horizontal direction H for applying the building material 15 within the building area 8. Optionally, a radiation heater 17 that serves for heating the applied building material 15 is arranged within the process chamber 3. An infra-red radiating device, for example, may be used as the radiation heater 17.

The laser sintering device 1 further contains an irradiation device 20 comprising a laser 21 which generates a laser beam 22 which is deflected by a deflecting device 23 and focused onto the working plane 7 by means of a focusing device 24 through a coupling window 25 arranged at the topside of the process chamber 3 in the chamber wall 4.

Further, the laser sintering device 1 includes a control unit 29, by means of which the individual constituent parts of the device 1 are controlled in a coordinated manner in order to perform the building process. As an alternative, the control unit may also partially or entirely be arranged outside the device. The control unit may include a CPU, the operation of which is controlled by a computer program (software). The computer program may be stored separately from the device on a storage medium, from which it may be loaded into the device, particularly into the control unit.

In operation, in order to apply a powder layer, the carrier 10 is first lowered by a height, which corresponds to the desired layer thickness. The recoater 16 first moves to the storage container 14 and gathers from it an amount of the building material 15 which is sufficient for applying a layer. It then moves across the build area 8 and applies a thin layer of the pulverulent building material 15 onto the building base or a present powder layer. The application is carried out at least across the whole cross-section of the object 2 to be produced, preferably across the complete build area 8, i.e. the area delimited by the container wall 6. Optionally, the pulverulent building material 15 is heated by the radiation heater to a working temperature. Subsequently, the cross-section of the object 2 to be produced is scanned by the laser beam 22 so that the pulverulent building material 13 is solidified at positions which correspond to the cross-section of the object 2 to be produced. In that process, the powder particles at those positions are partially or entirely melted so that after cooling, they are connected to each other in form of a solid body. These steps are repeated until the object 2 is completed and can be removed from the process chamber 3.

Figure 2:
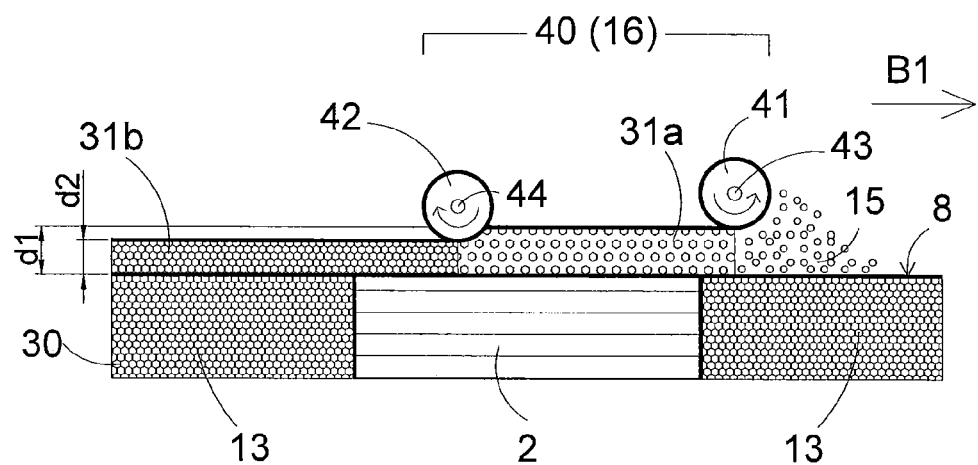
FIG. 2 is a schematic view of a portion of the device shown in FIG. 1 during an application of a powder layer in a first recoating direction.

The recoating process is shown in FIG. 2 more in detail. In a powder bed 30 built by the preceding process steps, the solidified portion of the object 2 to be produced is surrounded by powder 13 that has been left unsolidified. By means of a movement of the recoater 16 in a first recoating direction B1, a further powder layer of the building material 15 is applied onto the powder bed 30.

As shown in FIG. 2, the recoater 16 comprises a recoating unit 40 which is fixedly attached to the recoater 16 or which may be formed as an exchangeable module. The recoating unit 40 comprises two recoating rollers 41, 42 which are spaced apart from each other in the first recoating direction B1, which extend transversely, preferably perpendicularly, to the first recoating direction B1 in parallel with the build area 8 (perpendicular to the drawing area in the figure), and which are supported in a manner to be rotatable around rotation axes 43, 44 extending along their longitudinal directions. Both the recoating rollers 41, 42 may be driven in rotation independently of each other. In the present embodiment, both the recoating rollers 41, 42 have the same diameter. They may, however, also have different diameters.

The two recoating rollers 41, 42 are arranged within the recoating unit 40 in a height-adjustable way (i.e. adjustable in a vertical direction perpendicular to the build area 8). The two recoating rollers 41, 42 may be height-adjustable independently of each other, but they may also be arranged within the recoating unit 40 in a way that their height adjustment is coupled. The height adjustment may for example be realized by a suspension of the roller bearings at parallelograms which are driven axially by a linear displacement. Thereby, a mechanical transmission can be realized. The rotational drive of the rollers may for example be performed by coupling elements which allow an axial displacement and a small height adjustment. Other possibilities are coupled eccentric elements which vertically move the roller bearings.

When moving the recoating unit 40 in the first recoating direction B1, the recoating roller 41 arranged ahead is driven in a way that it rotates with reference to the first recoating direction B1 in a contra-rotating way (counterclockwise in FIG. 2). That means that its rotational direction is opposite to the rotation direction of a roller which would roll in the first recoating direction B1 over a base.

The recoating roller 41 arranged ahead pushes pulverulent building material 15 which comes from a (not shown) powder supply at the border of the build area or which is applied to the build area by a (not shown) powder application unit in front of the recoating roller 41 across the build area, thereby drawing it out to a regular thin powder layer 31*a* having a first thickness d1 without compacting it too much. The rotation of the recoating roller 41 in a contra-rotating way results in an application of the layer with low shear and thus regular without interior tensions. The first thickness d1 is determined by the distance of the lower edge of the recoating roller 41 arranged ahead from the powder bed 30.

The recoating roller 42 arranged behind is preferably driven in a way that it rotates with reference to the first recoating direction B1 in a co-rotating way (clockwise in FIG. 2). That means that its rotational direction is the same as the rotation direction of a roller which would roll in the first recoating direction B1 over a base.

The lower edge of the recoating roller 42 arranged behind has a smaller distance from the powder bed 30 than the lower edge of the recoating roller 41 arranged ahead. During a movement of the recoating roller 42 arranged behind in the first recoating direction B1 across the powder layer 31*a* applied by the recoating roller 41 arranged ahead, a force component thereby acts downwards onto the powder, whereby the powder particles are compressed and powder layer is compacted. This results in a compacted powder layer 31*b* having a second thickness d2 which is smaller than the first thickness d1. The second thickness d2 is determined by the distance of the lower edge of the recoating roller 42 arranged behind from the powder bed 30. By varying the lowering and the rotational direction and speed of the recoating roller 42 arranged behind, the compaction affect can be influenced within a broad range.

After applying and compacting the powder layer, the positions corresponding to the cross-section of the object to be manufactured in this layer are irradiated with the laser beam, whereby the powder layer is selectively solidified.

Figure 3:
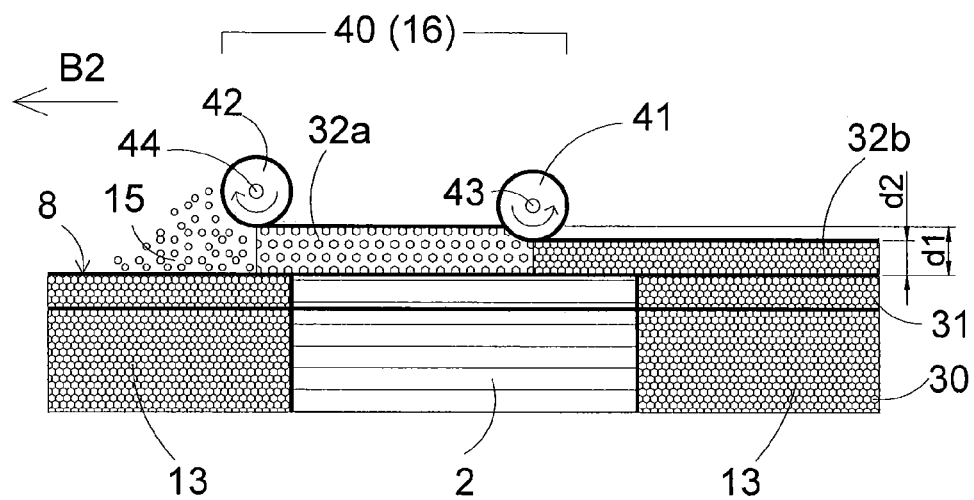
FIG. 3 is a schematic view of a portion of the device shown in FIG. 1 during an application of a powder layer in a second recoating direction.

As shown in FIG. 3, the recoating unit 40 then moves in a second recoating direction B2 across the build area 8 which is opposite to the first recoating direction B1. Opposite does not necessarily mean an angle of 180° in a plan view to the working area, but only that the second recoating direction B2 has a component pointing into the reverse direction of the first recoating direction B1. Preferably, the angle between the first and second recoating direction is between 150° and 210°, in a further preferred way it is 180°.

During the movement into the second recoating direction B2, the height adjustments of the recoating rollers are exchanged: the recoating roller 42 now arranged ahead has a greater distance from the selectively solidified powder layer 31 than the recoating roller 41 now arranged behind.

Also the rotational directions and speeds are adapted at a reversal of the direction of the recoating module 40. Due to the reversal of the recoating direction, the clockwise rotation of the recoating roller 42 now arranged ahead now corresponds to a rotation in a contra-rotating way, while the counterclockwise rotation of the recoating roller 41 now arranged behind corresponds to a rotation in a co-rotating way.

In an analogous way to the procedure described above with reference to FIG. 2, pulverulent building material 15 is drawn out by the recoating roller 42 now arranged ahead to a regular thin powder layer 32a having a first thickness d1. This powder layer 32a then is compacted by the recoating roller 41 now arranged behind, wherein the compacted powder layer 32b has a second thickness d2 which is smaller than the first thickness d1. Thicknesses d1 and d2 may be the same thicknesses as those shown in FIG. 2, or they may differ from those.

The compacted powder layer 32b is then selectively solidified by the laser beam 22, and the procedures shown in FIGS. 2 and 3 are repeated until the object 2 is completed.

The present invention thus provides a recoating unit by which applying and compacting the powder layer are performed separately from each other each by an individual roller, which may, however, be used in recoating directions opposite to each other.

While both the recoating rollers are formed in a height-adjustable way in the above embodiment, it also is sufficient if only one recoating roller is formed in a height-adjustable way. In this case, however, it has to be ensured that depending on the recoating direction, the recoating roller respectively arranged behind is arranged nearer to the working plane than the recoating roller respectively arranged ahead. The adjustment of the proper distances of the recoating rollers from the build area in this case may for example be achieved by an additional heightadjustability of the entire recoating unit.

While the recoating roller respectively arranged behind in the above embodiment serves for compacting the powder layer drawn out by the recoating roller respectively arranged ahead, it may also serve for a further smoothing of the powder layer or only to a further reduction of the layer thickness. Instead of the movement driven in the co-rotating way, the recoating roller respectively arranged behind may also stand still or may be driven in a contra-rotating way.

While each layer in the above embodiment is selectively solidified after its application, two or more layers may be applied without a solidification there between, and these layers may then be solidified together.

While recoating is performed in the above embodiment alternately in the first and second recoating direction, it may also be performed always in the same recoating direction, for example always in the first recoating direction.

Even though the present invention has been described with regard to a laser sintering device or a laser melting device, it is not restricted to laser sintering or laser melting. It may rather be applied to any arbitrary method for additive manufacturing of a three-dimensional object by applying and selectively solidifying a building material layer by layer.

The irradiation device may for example comprise one or multiple gas or solid body laser(s) or any other kind of laser such as laser diodes, especially VCSEL (Vertical Cavity Surface Emitting Laser) or VECSEL (Vertical External Cavity Surface Emitting Laser), or an array of those lasers. Generally, any device which is able to selectively irradiate energy in form of a wave or particle radiation onto a layer of the building material can be used as an irradiation device. Instead of a laser, for example another light source, an electron beam or any other energy or radiation source suited to solidify the building material may be used. Instead of deflecting a beam, also an irradiation by means of a movable line irradiator may be used. The invention may also be applied to the selective mask sintering, wherein an extended light source and a mask are used, or to the high-speed sintering (HSS), in which a material which increases (absorption sintering) or reduces (inhibition sintering) the absorption of radiation at the corresponding positions is selectively applied to the building material, and then irradiation is performed unselectively onto a large area or by means of the movable line irradiator.

Instead of supplying energy, the selective solidification of the applied building material may also be performed by means of 3D-printing, for example by applying an adhesive. Generally the invention is related to the additive manufacturing of an object by means of applying and selectively solidifying a building material layer by layer independent from the kind and manner in which the building material is solidified.

Various kinds of materials may be used as the building material, preferably powder, in particular metal powder, plastic powder, ceramic powder, sand, or filled or mixed powders.

The invention claimed is:

1. A recoating method carried out in a device for additive manufacturing of a three-dimensional object to be manufactured by selectively solidifying a powder building material, layer by layer by fusing the powder building material in consecutive layers that correspond to respective cross-sections of the object, comprising:
providing a recoating unit movable across a build area for applying an applied layer of the building material within the build area, when being moved in a direction of travel across the build area;
providing an electromagnetic source of focused energy for selectively solidifying the applied layer at positions corresponding to a cross-section of the object to be manufactured, the device repeating steps of applying and selectively solidifying until the object is completed, the recoating unit having first and second recoating rollers each rotatable in direction and spaced apart from each other in a first direction, so that in the direction of travel across the build area one of the first and second recoating rollers is arranged ahead and the other is arranged behind, the first and second recoating rollers extending into a second direction transverse to the first direction;

movably adjusting at least one of the first and second recoating rollers in a third direction which is orthogonal to the build area; and applying at least a first layer of the powder building material by moving the recoating unit across the build area in a first direction of travel, and applying at least a second layer of the powder building material by moving the recoating unit across the build area in a second direction of travel opposite the first direction of travel and back across the build area, the recoating roller arranged ahead in the direction of travel drawing out the powder building material to a first layer thickness and the recoating roller arranged behind compacting and/or smoothing the layer of the powder building material.

2. The method according to claim 1, further comprising associating a movement of the recoating unit with a location of the recoating roller arranged behind, and the recoating roller arranged behind being arranged nearer to a working plane than the recoating roller arranged ahead.

3. The method according to claim 1, wherein height adjustments of the recoating rollers are exchanged when the recoating unit reverses its direction of travel.

4. The method according to claim 1, wherein the recoating rollers each are mounted for rotation on a longitudinal axis, the rotational direction of each of the recoating rollers is selected in a way that the recoating roller arranged ahead rotates in an opposite direction to the direction of travel.

5. The method according to claim 1, wherein the rotational direction of each of the recoating rollers is selected in a way that the recoating roller arranged behind stands still or rotates in a same direction as the direction of travel.

6. The method according to claim 1, wherein each of the recoating rollers is adjustable in the third direction.

7. The method of claim 1, further comprising adjusting at least one of the recoating rollers and/or all of the recoating rollers in the third direction in a way that in a first position, the one of the recoating rollers projects further into the third direction than the other recoating roller, and in a second position, the other recoating roller projects further into the third direction than the one recoating roller.

8. The method of claim 1,
wherein all of the recoating rollers have the same diameter; or
wherein all of the recoating rollers are drivable independent of each other in the recoating unit.

9. The method of claim 1, wherein the recoating rollers are coupled to each other during movement in or against the third direction in the recoating unit.

10. The method of claim 1, wherein the recoating unit comprises an exchangeable recoating module.

11. The method of claim 1, further comprising providing a supplying device for supplying the building material in front of the first recoating roller.

12. The method of claim 1, wherein the recoating unit is arranged such that that the third direction is a vertical direction.

13. A recoating method carried out in a device for additive manufacturing of a three-dimensional object to be manufactured by selectively solidifying a powder building material, layer by layer by fusing the powder building material in consecutive layers which correspond to respective cross-sections of the object, comprising:

providing a recoating unit movable across a build area for applying an applied layer of the building material within the build area when being moved in a direction of travel across the build area;

providing an electromagnetic source of focused energy for selectively solidifying each applied layer at positions corresponding to a cross-section of the object to be manufactured, the device repeating steps of applying and selectively solidifying until the object is completed, the recoating unit having at least first and second recoating rollers each rotatable in a rotational direction and spaced apart from each other in a first direction, so that in the direction of travel across the build area one of the first and second recoating rollers is arranged ahead and the other is arranged behind, the first and second recoating rollers extending in a second direction transverse to the first direction of travel;

movably adjusting at least one of the first and second recoating rollers in a third direction which is orthogonal to the build area; and applying at least a first layer of the powder building material by moving the recoating unit across the build area in a first direction of travel, and applying at least a second layer of the powder building material by moving the recoatinger unit across the build area in a second direction of travel opposite to the first direction of travel and back across the build area, the recoating roller arranged ahead in the direction of travel drawing out the powder building material to a first layer thickness and the recoating roller arranged behind compacting the applied layer of the powder building material and reducing the thickness of the applied layer from the first layer thickness.

14. The method according to claim 13, wherein height adjustments of the recoating rollers are exchanged when the recoating unit reverses its direction of travel.

15. The method according to claim 13, wherein the recoating rollers each are mounted for rotation on a longitudinal axis, rotational direction of each of the recoating rollers is selected in a way that the first recoating roller rotates in an opposite direction to the first direction of travel.

16. The method according to claim 1, wherein rotational direction of each of the recoating rollers is selected in a way that the recoating roller arranged behind stands still or rotates in a same direction as the direction of travel.

17. In an apparatus for additive manufacturing of a three-dimensional object through selectively solidifying a powder building material, layer by layer, by fusing the powder building material in consecutive layers which correspond to respective cross-sections of the object, the method comprising:

providing a recoating unit movable across a build area surface for applying an applied layer of the building material within the build area, the recoating unit moving in a first direction across the build area and then in a second direction of travel opposite that of the first direction back across the build area;

providing an electromagnetic source of focused energy for selectively solidifying each applied layer at positions corresponding to a cross-section of the object to be manufactured, and repeating the steps of applying and selectively solidifying until the object is completed, the recoating unit having first and second recoating rollers each rotatable in a rotational direction and spaced apart from each other in the first and second directions of travel;

movably adjusting at least one of the recoating rollers in a third direction which is orthogonal to the build area, such that the at least one roller of the first and second recoating rollers is in a position farther away from the build surface in height than another of the first and second recoating rollers, the recoating roller which is farther away in height being arranged ahead in the first direction of travel as a lead recoating roller and the other recoating roller being arranged behind the lead recoating roller as a following recoating roller;

applying a layer of the powder building material over the build surface by depositing powder building material on the build surface and then moving the recoating unit across the build area in the first direction, and subsequently applying another layer of the powder building material by depositing powder build material to the build surface and moving the recoating unit across the build area in the second direction and back across the build area, the lead recoating roller spreading out the powder building material to a first layer thickness and the following recoating roller further modifying the first layer thickness, the first and second recoating rollers exchanging relative positions of height in movement of the recoating unit in the second direction.

18. The method of claim 17, wherein the following recoating roller modifies the first layer thickness by compacting the applied layer of the powder building material and reducing the thickness of the applied layer from the first layer thickness.

19. The method of claim 18 wherein the following recoating roller modifies the first layer thickness by further smoothing the first layer thickness.

* * * * *